United States Patent
Chen et al.

(10) Patent No.: US 11,574,414 B2
(45) Date of Patent: Feb. 7, 2023

(54) EDGE-BASED THREE-DIMENSIONAL TRACKING AND REGISTRATION METHOD AND APPARATUS FOR AUGMENTED REALITY, AND STORAGE MEDIUM

(71) Applicant: BEIJING BAIDU NETCOM SCIENCE AND TECHNOLOGY CO., LTD., Beijing (CN)

(72) Inventors: Sili Chen, Beijing (CN); Zhaoliang Liu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 99 days.

(21) Appl. No.: 17/021,190

(22) Filed: Sep. 15, 2020

(65) Prior Publication Data
US 2021/0264635 A1      Aug. 26, 2021

(30) Foreign Application Priority Data
Feb. 25, 2020   (CN) .......................... 202010118216.3

(51) Int. Cl.
G06T 7/70    (2017.01)
G06T 7/12    (2017.01)
(Continued)

(52) U.S. Cl.
CPC .................. *G06T 7/70* (2017.01); *G06T 7/12* (2017.01); *G06T 7/13* (2017.01); *G06T 7/246* (2017.01); *G06T 2207/20081* (2013.01)

(58) Field of Classification Search
CPC .... G06T 7/70; G06T 7/12; G06T 7/13; G06T 7/246; G06T 2207/20081;
(Continued)

(56) References Cited

U.S. PATENT DOCUMENTS

| | | |
|---|---|---|
| 8,437,502 B1 | 5/2013 | Siddiqui et al. |
| 2013/0076865 A1 | 3/2013 | Tateno et al. |

FOREIGN PATENT DOCUMENTS

| | | | |
|---|---|---|---|
| JP | 2010079452 A | 4/2010 | |
| JP | 2012002761 A | 1/2012 | |

(Continued)

OTHER PUBLICATIONS

Liu, "Beyond Pixels: Exploring New Representations and Applications for Motion Analysis", Ph.D thesis (Year: 2009).*

(Continued)

*Primary Examiner* — Qian Yang
(74) *Attorney, Agent, or Firm* — Lathrop GPM LLP (57) ABSTRACT

The present disclosure discloses an edge-based three-dimensional tracking and registration method and apparatus for augmented reality, and a storage medium. The method includes: obtaining an initial pose of a three-dimensional object in an image; extracting edgelet features of a contour of the three-dimensional object based on the initial pose; dividing the edgelet features into groups, and performing searching on the image to find a matching point corresponding to respective edgelet feature in each group; and calculating a pose of the three-dimensional object based on matching points found in the groups.

12 Claims, 3 Drawing Sheets

(51) Int. Cl.
*G06T 7/246* (2017.01)
*G06T 7/13* (2017.01)

(58) Field of Classification Search
CPC . G06T 2207/10016; G06T 2207/20016; G06T 7/33; G06T 19/00; G06T 19/006
See application file for complete search history.

(56) References Cited

FOREIGN PATENT DOCUMENTS

| | | |
|---|---|---|
| JP | 2018163692 A | 10/2018 |
| KR | 20190014105 A | 2/2019 |
| WO | WO 2008153721 A1 | 12/2008 |

OTHER PUBLICATIONS

European Patent Application No. 20216518.9 extended Search and Opinion dated May 20, 2021, 8 pages.
Loesch, A. et al. "Localization of 3D objects using model-constrained SLAM" Machine Vision and Applications, Springer Verlag, DE, vol. 29, No. 7, Jun. 30, 2018, pp. 1041-1068.
Hamdi, B.A., et al. "Automatic Inspection of Aeronautical Mechanical Assemblies by Matching the 3D CAD Model and Real 2D Images" Journal of Imaging, 5(10):81, Oct. 19, 2019, pp. 1-28.
Korean Patent Application No. 10-2021-0023809 Office Action dated Feb. 21, 2022, 5 pages.
Korean Patent Application No. 10-2021-0023809 English translation of Office Action dated Feb. 21, 2022, 5 pages.
Japanese Patent Application No. 2021-022634 Office Action dated Feb. 15, 2022, 3 pages.
Japanese Patent Application No. 2021-022634 English translation of Office Action dated Feb. 15, 2022, 3 pages.
Kasinski, A. et al. "Managing Processes of Perceptual Organization for Emerging Geometrical Objects" SMC 2000 conference proceedings. 2000 IEEE international conference on systems, man and cybernetics. cybernetics evolving to systems, humans, organizations, and their complex interactions, pp. 1604-1609 vol. 3.

* cited by examiner

FIG. 5

EDGE-BASED THREE-DIMENSIONAL TRACKING AND REGISTRATION METHOD AND APPARATUS FOR AUGMENTED REALITY, AND STORAGE MEDIUM

CROSS-REFERENCE TO RELATED APPLICATION

The present application is based upon and claims priority to Chinese Patent Application No. 202010118216.3, filed on Feb. 25, 2020, the entire contents of which are incorporated herein by reference.

FIELD

The present disclosure relates to a field of computer visual processing, and more particularly, to an edge-based three-dimensional tracking and registration method and apparatus for augmented reality, and a computer readable storage medium.

BACKGROUND

A registration and tracking algorithm for three-dimensional objects is an important algorithm for augmented reality (AR) products. To track a three-dimensional object in reality, an initial relative pose of the three-dimensional object relative to an image capture device such as a mobile phone and a camera may be determined first. The process of obtaining the initial relative pose is called registration.

In related technologies, the registration method is usually divided into two steps. The first step is to search for a target object in the full image by template matching and to obtain an approximate pose. The second step is to perform pose calibration based on the result of the first step to obtain a precise pose. In general, the second step is implemented through the following two methods. The first method is to calculate the precise pose based on edge matching, and the second method is to calculate the precise pose based on deep learning.

Currently, there are problems as follows. With respect to the above-mentioned first method, although it is fast, it is not robust in some complex environments (such as a messy background, an occlusion, etc.). Since the edgelet features found are seldom correctly matched, matching points are easy to lose efficacy. The second method is robust, but the calculation of the precise pose is slow.

SUMMARY

The present disclosure aims to solve one of the technical problems in the related art.

Embodiments of the present disclosure provide an edge-based three-dimensional tracking and registration method for augmented reality, including: obtaining an initial pose of a three-dimensional object in an image; extracting edgelet features of a contour of the three-dimensional object based on the initial pose; dividing the edgelet features into groups, and performing searching on the image to find a matching point corresponding to respective edgelet feature in each group; and calculating a pose of the three-dimensional object based on matching points found in the groups.

Embodiments of the present disclosure provide an edge-based three-dimensional tracking and registration apparatus for augmented reality, including: one or more processors; a memory storing instructions executable by the one or more processors; in which the one or more processors are configured to: obtain an initial pose of a three-dimensional object in an image; extract edgelet features of a contour of the three-dimensional object based on the initial pose; divide the edgelet features into groups; perform searching on the image to find a matching point corresponding to respective edgelet feature in each group; and calculate a pose of the three-dimensional object based on matching points found in the groups.

Embodiments of the present disclosure provide a non-transitory computer-readable storage medium having a computer instruction stored thereon. The computer instruction is configured to make a computer implement an edge-based three-dimensional tracking and registration method for augmented reality. The method includes: obtaining an initial pose of a three-dimensional object in an image; extracting edgelet features of a contour of the three-dimensional object based on the initial pose; dividing the edgelet features into groups, and performing searching on the image to find a matching point corresponding to respective edgelet feature in each group; and calculating a pose of the three-dimensional object based on matching points found in the groups.

Other effects of the above-mentioned optional implementations will be described below in combination with specific embodiments.

BRIEF DESCRIPTION OF THE DRAWINGS

The accompanying drawings are used for a better understanding of the solution, and do not constitute a limitation of the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

The present disclosure proposes an edge-based three-dimensional tracking and registration method and apparatus for augmented reality, an electronic device and a non-transitory computer-readable storage medium having a computer instruction stored thereon. The present disclosure solves a problem of incompatibility between the calculation speed and robustness of a tracking and registration algorithm for three-dimensional objects in the prior art. In detail, the following describes the edge-based three-dimensional tracking and registration method and apparatus for augmented reality, the electronic device and the non-transitory computer-readable storage medium having the computer instruction stored thereon according to embodiments of the present disclosure with reference to the accompanying drawings.

The present disclosure has the following advantages or beneficial effects. The edgelet features of the contour of the three-dimensional object are extracted based on the initial pose of the three-dimensional object in the image. The edgelet features are divided into groups, and by taking each group as a basic unit, the searching is performed on the image to find the matching point corresponding to respective edgelet feature in each group. The precise pose of the three-dimensional object is calculated based on the matching points found in the groups. In the entire tracking and registration process, by dividing the edgelet features of the contour of the three-dimensional object into groups, and performing the searching on the image by taking each group as a basic unit, so as to ensure the number of correctly matching points of the edgelet features found in the image and to guarantee the effectiveness of the matching points found. In this manner, the tracking and registration method according to the present disclosure is also robust in some complex environments (such as a messy background, an occlusion, etc.), and also, a fast calculation speed may be guaranteed. Consequently, a precise pose of the three-dimensional object may be calculated quickly and robustly, requirements on hardware of a computing device are low as the algorithm has a low computational complexity, and AR three-dimensional object tracking and representation may be performed on several devices. In addition, a problem of incompatibility between the calculation speed and robustness of a tracking and registration algorithm for a three-dimensional object in the prior art is overcome.

Figure 1:
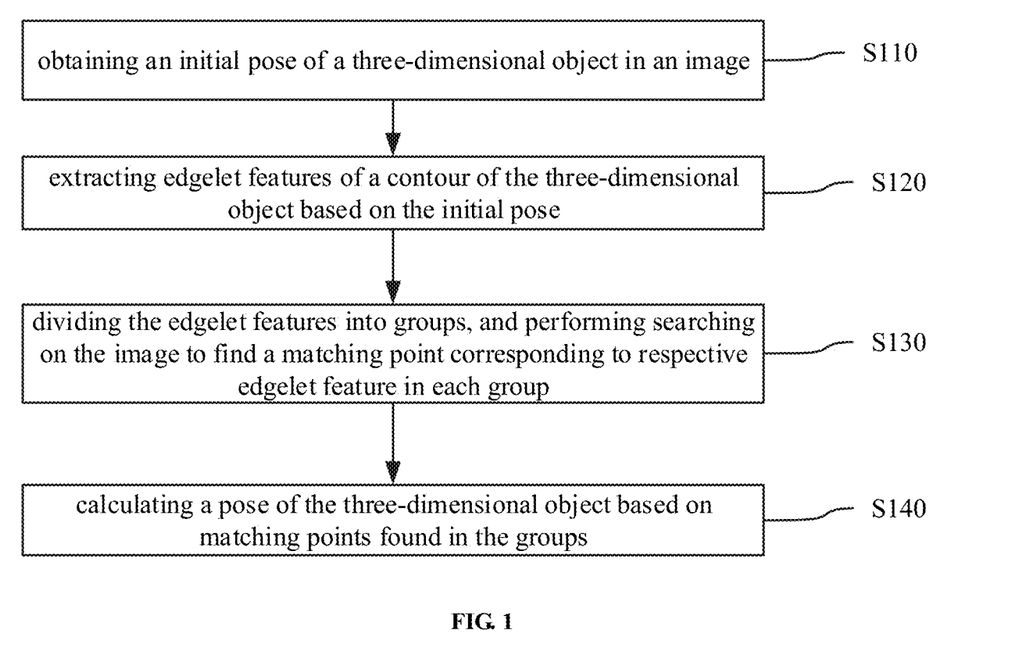
FIG. 1 is a flowchart of an edge-based three-dimensional tracking and registration method for augmented reality according to an embodiment of the present disclosure.

FIG. 1 is a flow chart of an edge-based three-dimensional tracking and registration method for augmented reality according to an embodiment of the present disclosure. It should be noted that the edge-based three-dimensional tracking and registration method for augmented reality according to embodiments of the present disclosure may be applied to an edge-based three-dimensional tracking and registration apparatus for augmented reality according to embodiments of the present disclosure. The apparatus may be integrated in an electronic device. The electronic device may be various electronic devices with a display screen, and may be a mobile terminal, such as a smart phone, a tablet computer, or an augmented reality (AR) device. It should be noted that the electronic device has an image capture device.

As illustrated in FIG. 1, the edge-based three-dimensional tracking and registration method for augmented reality may include the following.

At block S110, an initial pose of a three-dimensional object in an image is obtained.

In embodiments of the present disclosure, when a three-dimensional object is recognized, tracking may be performed on the three-dimensional object. When it is determined to track the three-dimensional object, the initial pose of the three-dimensional object in the image may be obtained first. The initial pose may be understood as an approximate position and a pose of the three-dimensional object in the image.

The initial pose of the three-dimensional object in the image may be obtained through the LineMod (a line function) algorithm.

For example, gradient information of the image and features of normal directions of the surface of the three-dimensional object may be processed by the LineMod algorithm and determined as a basis for template matching, so as to obtain the initial pose of the three-dimensional object in the image.

At block S120, edgelet features of a contour of the three-dimensional object are extracted based on the initial pose.

In embodiments of the present disclosure, after the initial pose of the three-dimensional object in the image is obtained, a projection image may be acquired by performing projection on a model of the three-dimensional object based on the initial pose. A visible edge of an object in the projection image may be identified, and sampling points may be allocated along the visible edge at a regular spacing. The sampling points and normal directions of model line segments formed by the sampling points are determined as the edgelet features of the contour of the three-dimensional object. It can be understood that the sampling points on the visible edge, e.g., two adjacent points (one and the immediate proceeding or following one), may form a line segment, and the normal direction of the line segment is vertical to the line segment. The edgelet is also known as moving edge in the field.

The projection image may be acquired may be acquired by performing projection on the model of the three-dimensional object based on a projection method. The projection method includes but is not limited to a perspective projection method, an orthographic projection method, and the like.

At block S130, the edgelet features are divided into groups, and searching is performed on the image to find a matching point corresponding to respective edgelet feature in each group.

That is, after the edgelet features of the contour of the three-dimensional object are extracted, the edgelet features are divided into groups based on an overall geometric structure of the contour of the three-dimensional object, and then searching and matching are performed on the image based on the groups. In embodiments of the present disclosure, the edgelet features may be divided into different groups based on the overall geometric structure of the contour of the three-dimensional object. In each group, normal directions of the edgelet features are the same or an included angle between each two normal directions is within a first preset range, and each group has its own average normal vector.

After the edgelet features are divided into groups, each group may be taken as a basic unit, and the searching may be performed on the image along a direction of the respective average normal vector of each group to find the matching point of the respective edgelet feature in each group.

The overall geometric structure of the contour of the three-dimensional object includes but is not limited to, an included angle between normal vectors of adjacent edgelets and irregularities (convexity-concavity conditions) of the edgelets.

In other words, the edgelet features may be divided into groups based on the overall geometric structure of the contour of the three-dimensional object, such as the included angle between normal vectors of adjacent edgelets and irregularities. In each group, the normal directions of the edgelet features are the same or the included angle between each two normal directions is within the first preset range (the first preset range may be understood as that in the first preset range, the normal directions of the edgelet features in each group are basically the same). Each group has its own average normal vector. By taking each group as a basic unit, searching is performed on the image along a direction of the respective average normal vector of each group to find the matching point of the respective edgelet feature in each group.

In embodiments of the present disclosure, the matching may be performed in following manners. Bidirectional searching is performed within a certain range along an average direction, and at each search position, edgelet features in a group are matched nearby to see how many matching points may be obtained. A position with the most matching points is selected as an optimal matching position of the group, and the matching points of the edgelet features at this position are determined as their respective matching points.

Figure 2:
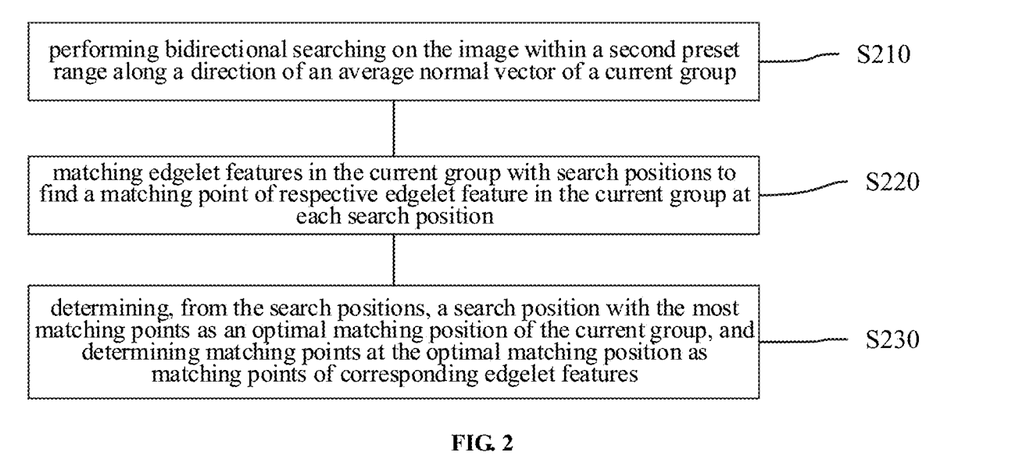
FIG. 2 is a flowchart of performing searching on the image along a direction of respective average normal vector of each group to find matching points of the respective edgelet feature in each group according to an embodiment of the present disclosure.

In an embodiment of the present disclosure, as illustrated in FIG. 2, the specific implementation process of performing searching on the image along the direction of the respective average normal vector of each group to find the matching point of the respective edgelet feature in each group will be described below.

At block S210, bidirectional searching is performed on the image within a second preset range along a direction of an average normal vector of a current group.

That is to say, the edgelet features are divided into different groups. For each group, bidirectional searching is performed within a certain range along a direction of an average normal vector of the current group. The step length of the searching is a unit pixel.

At block 220, edgelet features in the current group are matched at each search position to find matching points of respective edgelet feature in the current group at each search position.

In embodiments of the present disclosure, at each search position of the edgelet features in the current group, gradient extreme points each with a gradient value greater than a preset threshold along the direction of the average normal vector of the current group are determined as candidate points. Among the candidate points, a candidate point with the smallest included angle between a gradient direction and the direction of the average normal vector of the current group is selected as a matching point of the edgelet features at the search position.

The gradient value along the direction of the average normal vector of the current group may be calculated by a gradient general formula or a gradient median difference formula.

That is to say, through the general gradient formula or the gradient difference formula of median values, the gradient value along the direction of the average normal vector of the current group is calculated. The gradient extreme points each with the gradient value greater than the preset threshold along the direction of the average normal vector in a gradient map may be determined at each search position of the edgelet features in the current group. For example, if a gradient value of a certain pixel point is large enough and larger than gradient values of pixels on both sides of the direction of the normal vector, the pixel is determined as a candidate point. Among the candidate points, the candidate point with the smallest included angle (for example, 0-90 degrees) between the gradient direction and the direction of the average normal vector of the current group is determined as the matching point of the edgelet features at the search position.

At block 230, a search position with the most matching points is determined, from the search positions, as an optimal matching position of the current group, and matching points at the optimal matching position are determined as matching points of corresponding edgelet features.

In other words, after the matching point of respective edgelet feature in the current group at each search position is found, the search position with the most matching points may be determined among the searching positions as the optimal matching position of the current group, and the matching points at the optimal matching position may be determined as the matching points of corresponding edgelet features.

Figure 3:
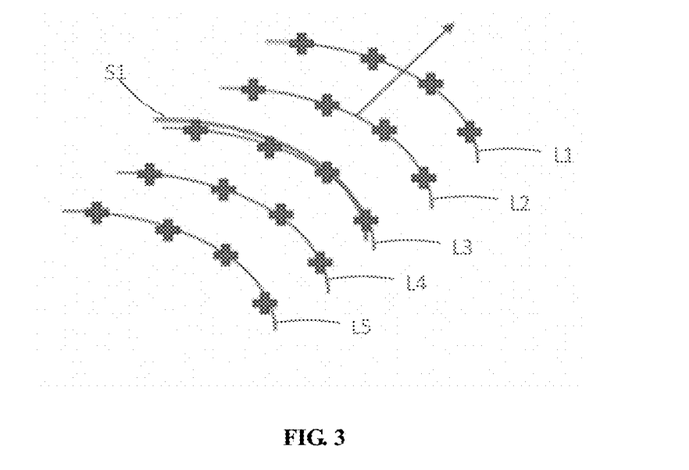
FIG. 3 is a schematic diagram of finding matching points of respective edgelet feature in a current group at each search position according to an embodiment of the present disclosure.

For example, as illustrated in FIG. 3, S1 is the correct edge position in the image, L1, L2, L3, L4, and L5 are search positions of respective edgelet features in the current group, and the arrow shows the direction of the average normal vector of the current group, and the symbol "+" indicates a center position of each edgelet in a group corresponding to each search position. At L1, L2, L3, L4, L5, gradient extreme points each with a gradient value greater than the preset threshold along the direction of the average normal vector of the current group are found and determined as candidate points. Among the candidate points, a candidate point with the smallest included angle between a gradient direction and the direction of the average normal vector of the current group is determined as a matching point of the edgelet features at the search position. For example, since S1 is the correct edge position, when searching and matching are performed on the current group at the search positions L1, L2, L3, L4 and L5 along the direction of the average normal vector, it may be found that the search position L3 is the position at which the edgelet features has the most matching points. Consequently, the search position L3 may be determined as the optimal matching position of the group, and matching points of respective edgelet features at the search position L3 may be determined as matching points of the edgelet features.

At block S140, a pose of the three-dimensional object is calculated based on matching points found in the groups.

In embodiments of the present disclosure, on the basis of the matching points found in the groups, a precise pose of the three-dimensional object may be calculated through a combination of the RANSAC algorithm and the IRLS algorithm.

According to the edge-based three-dimensional tracking and registration method for augmented reality, the initial pose of the three-dimensional object in the image is obtained. The edgelet features of the contour of the three-dimensional object are extracted based on the initial pose. The edgelet features are divided into groups, and by taking each group as a basic unit, the searching is performed on the image to find the matching point corresponding to respective edgelet feature in each group. The pose of the three-dimensional object is calculated based on the matching points found in the groups. According to the method, in the entire tracking and registration process, by dividing the edgelet features of the contour of the three-dimensional object into groups, and performing the searching on the image by taking each group as a basic unit, so as to ensure the number of correctly matching points of the edgelet features found in the image and to guarantee the effectiveness of the matching points found. In this manner, the tracking and registration method according to the present disclosure is also robust in some complex environments (such as a messy background, an occlusion, etc.), and also, a fast calculation speed may be guaranteed. Consequently, the precise pose of the three-dimensional object may be calculated quickly and robustly, requirements on hardware of a computing device are low as the algorithm has a low computational complexity, and AR three-dimensional object tracking and representation may be performed on several devices.

Figure 4:
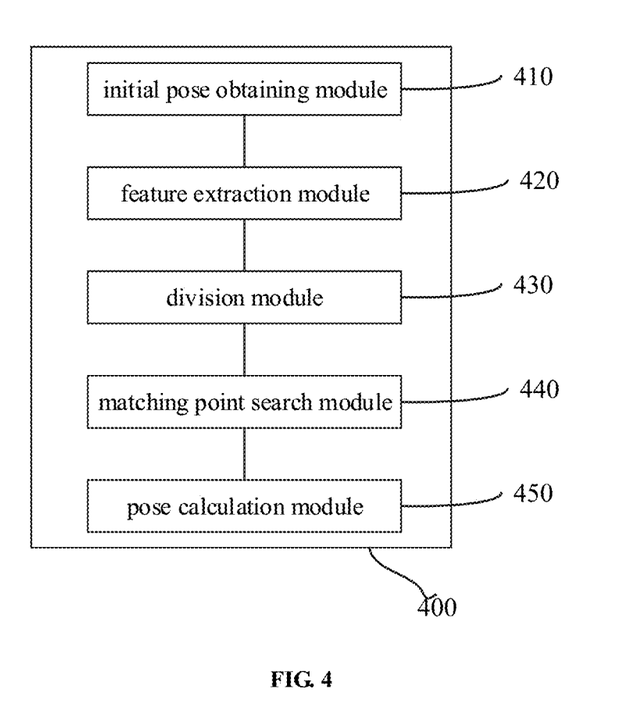
FIG. 4 is a block diagram of an edge-based three-dimensional tracking and registration apparatus for augmented reality according to an embodiment of the present disclosure.

Corresponding to the edge-based three-dimensional tracking and registration method for augmented reality according to the foregoing embodiments, an embodiment of the present disclosure also provides an edge-based three-dimensional tracking and registration apparatus for augmented reality. Since the edge-based three-dimensional tracking and registration apparatus for augmented reality according to the embodiment of the present disclosure corresponds to the edge-based three-dimensional tracking and registration method for augmented reality according to the above-mentioned embodiments, the implementation of the edge-based three-dimensional tracking and registration method for augmented reality is also applicable to the edge-based three-dimensional tracking and registration apparatus for augmented reality according to the embodiment. Consequently, the implementation of the apparatus will not be repeated here. FIG. 4 is a block diagram of an edge-based three-dimensional tracking and registration apparatus for augmented reality according to an embodiment of the present disclosure.

As illustrated in FIG. 4, an edge-based three-dimensional tracking and registration apparatus for augmented reality 400 includes an initial pose obtaining module 410, a feature extraction module 420, a division module 430, a matching point search module 440, and a pose calculation module 450.

The initial pose obtaining module 410 is configured to obtain an initial pose of a three-dimensional object in an image.

The feature extraction module 420 is configured to extract edgelet features of a contour of the three-dimensional object based on the initial pose. As an example, the feature extraction module 420 is specifically configured to: acquire a projection image by performing projection on a model of the three-dimensional object based on the initial pose; identify a visible edge of an object in the projection image, and allocating sampling points along the visible edge at a regular spacing; and determine the sampling points and normal directions of model line segments formed by the sampling points as the edgelet features of the contour of the three-dimensional object.

The division module 430 is configured to divide the edgelet features into groups. As an example, the division module 430 is specifically configured to divide the edgelet features into groups based on an overall geometric structure of the contour of the three-dimensional object. Normal directions of the edgelet features in each group are the same or an included angle between each two normal directions is within a first preset range, and each group has respective average normal vector.

The matching point search module 440 is configured to perform searching on the image to find a matching point corresponding to respective edgelet feature in each group. As an example, the matching point search module 440 is specifically configured to perform searching on the image along a direction of the respective average normal vector of each group to find the matching point of the respective edgelet feature in each group.

In embodiments of the present disclosure, the matching point search module 440 is specifically configured to: perform bidirectional searching on the image within a second preset range along a direction of an average normal vector of a current group; match edgelet features in the current group at search positions to find a matching point of respective edgelet feature in the current group at each search position; and determine, from the search positions, a search position with the most matching points as an optimal matching position of the current group, and determine matching points at the optimal matching position as matching points of corresponding edgelet features.

In embodiments of the present disclosure, the matching point search module 440 is specifically configured to: determine, at each search position of the edgelet features in the current group, gradient extreme points each with a gradient value greater than a preset threshold along the average normal vector of the current group as candidate points; and determine, from the candidate points, a candidate point with the smallest included angle between a gradient direction and the direction of the average normal vector of the current group as a matching point of the edgelet features at the search position.

The pose calculation module 450 is configured to calculate a pose of the three-dimensional object based on matching points found in the groups.

With the edge-based three-dimensional tracking and registration apparatus for augmented reality according to embodiments of the present disclosure, the initial pose of the three-dimensional object in the image is obtained. The edgelet features of the contour of the three-dimensional object are extracted based on the initial pose. The edgelet features are divided into groups, and by taking each group as a basic unit, the searching is performed on the image to find the matching point corresponding to respective edgelet feature in each group. The precise pose of the three-dimensional object is calculated based on the matching points found in the groups. In the entire tracking and registration process, by dividing the edgelet features of the contour of the three-dimensional object into groups, and performing the searching on the image by taking each group as a basic unit, so as to ensure the number of correctly matching points of the edgelet features found in the image and to guarantee the effectiveness of the matching points found. In this manner, the tracking and registration method according to the present disclosure is also robust in some complex environments (such as a messy background, an occlusion, etc.), and also, a fast calculation speed may be guaranteed. Consequently, a precise pose of the three-dimensional object may be calculated quickly and robustly, requirements on hardware of a computing device are low as the algorithm has a low computational complexity, and AR three-dimensional object tracking and representation may be performed on several devices.

According to embodiments of the present disclosure, an electronic device and a readable storage medium are provided.

Figure 5:
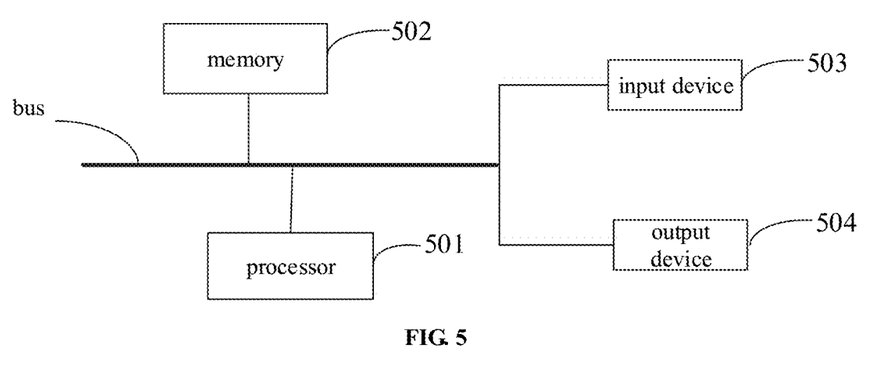
FIG. 5 is a block diagram of an electronic device for implementing an edge-based three-dimensional tracking and registration method for augmented reality according to an embodiment of the present disclosure.

FIG. 5 is a block diagram of an electronic device for implementing an edge-based three-dimensional tracking and registration method for augmented reality according to an embodiment of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As shown in FIG. 5, the electronic device includes: one or more processors 501, a memory 502, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 501 is taken as an example in FIG. 5.

The memory 502 is a non-transitory computer-readable storage medium according to the present disclosure. The memory stores instructions executable by at least one processor, so that the at least one processor executes the edge-based three-dimensional tracking and registration method for augmented reality according to the present disclosure. The non-transitory computer-readable storage medium according to the present disclosure stores computer instructions, which are configured to make the computer execute the edge-based three-dimensional tracking and registration method for augmented reality according to the present disclosure.

As a non-transitory computer-readable storage medium, the memory 502 may be configured to store non-transitory software programs, non-transitory computer executable programs and modules, such as program instructions/modules (for example, the initial pose obtaining module 410, the feature extraction module 420, the division module 430, the matching point search module 440, and the pose calculation module 450 illustrated in FIG. 4) corresponding to the edge-based three-dimensional tracking and registration method for augmented reality according to embodiments of the present disclosure. The processor 501 executes various functional applications and performs data processing of the server by running non-transitory software programs, instructions and modules stored in the memory 502, that is, the edge-based three-dimensional tracking and registration method for augmented reality according to the foregoing method embodiments is implemented.

The memory 502 may include a storage program area and a storage data area, where the storage program area may store an operating system and applications required for at least one function; and the storage data area may store data created according to the use of the electronic device that implements the edge-based three-dimensional tracking and registration method for augmented reality, and the like. In addition, the memory 502 may include a high-speed random access memory, and may further include a non-transitory memory, such as at least one magnetic disk memory, a flash memory device, or other non-transitory solid-state memories. In some embodiments, the memory 502 may optionally include memories remotely disposed with respect to the processor 501, and these remote memories may be connected to the electronic device, which is configured to implement the edge-based three-dimensional tracking and registration method for augmented reality, through a network. Examples of the network include, but are not limited to, the Internet, an intranet, a local area network, a mobile communication network, and combinations thereof.

The electronic device configured to implement the edge-based three-dimensional tracking and registration method for augmented reality may further include an input device 503 and an output device 504. The processor 501, the memory 502, the input device 503 and the output device 504 may be connected through a bus or in other manners. FIG. 5 is illustrated by establishing the connection through a bus.

The input device 503 may receive input numeric or character information, and generate key signal inputs related to user settings and function control of the electronic device configured to implement the edge-based three-dimensional tracking and registration method for augmented reality, such as a touch screen, a keypad, a mouse, a trackpad, a touchpad, a pointing stick, one or more mouse buttons, trackballs, joysticks and other input devices. The output device 504 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, the initial pose of the three-dimensional object in the image is obtained. The edgelet features of the contour of the three-dimensional object are extracted based on the initial pose. The edgelet features are divided into groups, and the searching is performed on the image to find the matching point corresponding to respective edgelet feature in each group. The pose of the three-dimensional object is calculated based on the matching points found in the groups. According to the method, the edgelet features of the contour of the three-dimensional object are extracted based on the initial pose of the three-dimensional object. The edgelet features are divided into groups, and searching is performed on the image to find a matching point corresponding to respective edgelet feature in each group. Consequently, the precise pose of the three-dimensional object may be calculated quickly and robustly, requirements on hardware of a computing device are low as the algorithm has a low computational complexity, and AR tracking and display of the three-dimensional object may be performed on several devices.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. An edge-based three-dimensional tracking and registration method for augmented reality, comprising:
    obtaining an initial pose of a three-dimensional object in an image;
    extracting edgelet features of a contour of the three-dimensional object based on the initial pose;
    dividing the edgelet features into groups, comprising:
        dividing the edgelet features into groups based on an included angle between normal vectors of adjacent edgelets and convexity-concavity conditions of the edgelets, wherein normal directions of the edgelet features in each group are the same, and each group has an average normal vector;
    for each of the groups, finding matching points of the edgelet features by performing searching on the image along a direction of the average normal vector; and
    calculating a pose of the three-dimensional object based on matching points found in the groups.

2. The method of claim 1, wherein extracting the edgelet features of the contour of the three-dimensional object based on the initial pose comprises:
    acquiring a projection image by performing projection on a model of the three-dimensional object based on the initial pose;
    identifying a visible edge of an object in the projection image, and allocating sampling points along the visible edge at a regular spacing; and
    determining the sampling points and normal directions of model line segments formed by the sampling points as the edgelet features of the contour of the three-dimensional object.

3. The method of claim 1, wherein performing searching on the image along the direction of the respective average normal vector of each group to find the matching point of the respective edgelet feature in each group comprises:
    performing bidirectional searching on the image within a second preset range along a direction of an average normal vector of a current group;
    matching edgelet features in the current group at search positions to find a matching point of respective edgelet feature in the current group at each search position; and
    determining, from the search positions, a search position with the most matching points as an optimal matching position of the current group, and determining matching points at the optimal matching position as matching points of corresponding edgelet features.

4. The method of claim 3, wherein matching the edgelet features in the current group with the search positions, to find the matching point of the respective edgelet feature in the current group at each search position comprises:
    determining, at each search position of the edgelet features in the current group, gradient extreme points each with a gradient value greater than a preset threshold along the direction of the average normal vector of the current group as candidate points; and
    determining, from the candidate points, a candidate point with the smallest included angle between a gradient direction and the direction of the average normal vector of the current group as a matching point of the edgelet features at the search position.

5. An edge-based three-dimensional tracking and registration apparatus for augmented reality, comprising:
    one or more processors;
    a memory storing instructions executable by the one or more processors;
    wherein the one or more processors are configured to:
    obtain an initial pose of a three-dimensional object in an image;

extract edgelet features of a contour of the three-dimensional object based on the initial pose;
divide the edgelet features into groups based on an included angle between normal vectors of adjacent edgelets and convexity-concavity conditions of the edgelet, wherein normal directions of the edgelet features in each group are the same, and each group has an average normal vector;
for each of the groups, find matching points of the edgelet features by performing searching on the image along a direction of the average normal vector; and
calculate a pose of the three-dimensional object based on matching points found in the groups.

6. The apparatus of claim 5, wherein the one or more processors are configured to:
acquire a projection image by performing projection on a model of the three-dimensional object based on the initial pose;
identify a visible edge of an object in the projection image, and allocating sampling points along the visible edge at a regular spacing; and
determine the sampling points and normal directions of model line segments formed by the sampling points as the edgelet features of the contour of the three-dimensional object.

7. The apparatus of claim 5, wherein the one or more processors are configured to:
perform bidirectional searching on the image within a second preset range along a direction of an average normal vector of a current group;
match edgelet features in the current group at search positions to find a matching point of respective edgelet feature in the current group at each search position; and
determine, from the search positions, a search position with the most matching points as an optimal matching position of the current group, and determine matching points at the optimal matching position as matching points of corresponding edgelet features.

8. The apparatus of claim 7, wherein the one or more processors are configured to:
determine, at each search position of the edgelet features in the current group, gradient extreme points each with a gradient value greater than a preset threshold along the average normal vector of the current group as candidate points; and
determine, from the candidate points, a candidate point with the smallest included angle between a gradient direction and the direction of the average normal vector of the current group as a matching point of the edgelet features at the search position.

9. A non-transitory computer-readable storage medium having a computer instruction stored thereon, wherein the computer instruction is configured to make a computer implement an edge-based three-dimensional tracking and registration method for augmented reality, and the method comprises:
obtaining an initial pose of a three-dimensional object in an image;
extracting edgelet features of a contour of the three-dimensional object based on the initial pose;
dividing the edgelet features into groups, comprising:
dividing the edgelet features into groups based on an included angle between normal vectors of adjacent edgelets and convexity-concavity conditions of the edgelets, wherein normal directions of the edgelet features in each group are the same, and each group has an average normal vector;
for each of the groups, finding matching points of the edgelet features by performing searching on the image along a direction of the average normal vector; and
calculating a pose of the three-dimensional object based on matching points found in the groups.

10. The non-transitory computer-readable storage medium of claim 9, wherein extracting the edgelet features of the contour of the three-dimensional object based on the initial pose comprises:
acquiring a projection image by performing projection on a model of the three-dimensional object based on the initial pose;
identifying a visible edge of an object in the projection image, and allocating sampling points along the visible edge at a regular spacing; and
determining the sampling points and normal directions of model line segments formed by the sampling points as the edgelet features of the contour of the three-dimensional object.

11. The non-transitory computer-readable storage medium of claim 9, wherein performing searching on the image along the direction of the respective average normal vector of each group to find the matching point of the respective edgelet feature in each group comprises:
performing bidirectional searching on the image within a second preset range along a direction of an average normal vector of a current group;
matching edgelet features in the current group at search positions to find a matching point of respective edgelet feature in the current group at each search position; and
determining, from the search positions, a search position with the most matching points as an optimal matching position of the current group, and determining matching points at the optimal matching position as matching points of corresponding edgelet features.

12. The non-transitory computer-readable storage medium of claim 11, wherein matching the edgelet features in the current group with the search positions, to find the matching point of the respective edgelet feature in the current group at each search position comprises:
determining, at each search position of the edgelet features in the current group, gradient extreme points each with a gradient value greater than a preset threshold along the direction of the average normal vector of the current group as candidate points; and
determining, from the candidate points, a candidate point with the smallest included angle between a gradient direction and the direction of the average normal vector of the current group as a matching point of the edgelet features at the search position.

* * * * *